United States Patent [19]

Peters

[11] Patent Number: 4,832,717

[45] Date of Patent: May 23, 1989

[54] CLEAN AIR CABINET

[75] Inventor: Max D. Peters, Plymouth, Minn.

[73] Assignee: Nu Aire, Inc., Plymouth, Minn.

[21] Appl. No.: 192,203

[22] Filed: May 10, 1988

[51] Int. Cl.[4] .............................................. B01D 46/00

[52] U.S. Cl. ...................................... 55/473; 55/385.2; 55/DIG. 29; 55/DIG. 18; 98/115.3

[58] Field of Search ................ 55/DIG. 29, DIG. 18, 55/385 A, 473; 98/115.3

[56] References Cited

U.S. PATENT DOCUMENTS

| | | | |
|---|---|---|---|
| 3,229,611 | 1/1966 | Berger | 98/115.3 |
| 3,944,405 | 3/1976 | Calsteren et al. | 55/473 |
| 4,548,627 | 10/1985 | Landy | 55/385 A |

FOREIGN PATENT DOCUMENTS

| | | | |
|---|---|---|---|
| 0139128 | 2/1985 | European Pat. Off. | 98/115.3 |
| 22883 | 2/1977 | Japan | 55/DIG. 18 |

OTHER PUBLICATIONS

Standard Number 49 Class II (Laminar Flow) Biohazard Cabinetry of the National Sanitation Foundation brochure (5/83).

*Primary Examiner*—Bernard Nozick
*Attorney, Agent, or Firm*—Merchant, Gould, Smith, Edell, Welter & Schmidt

[57] ABSTRACT

A clean air cabinet is disclosed including a cabinet shell defining a cabinet interior. Internal walls including a ceiling, back wall and floor are disposed within the interior and define a work area. A first plenum connects a blower outlet with air passages formed through the ceiling. A first high efficiency particulate air (HEPA) filter is disposed within the first plenum. A second air plenum connects air passages formed in the floor with a blower inlet. A third plenum connects air passages formed in the work area back wall with an exhaust opening formed through the cabinet shell. A second HEPA filter is disposed within the third plenum.

13 Claims, 3 Drawing Sheets

CLEAN AIR CABINET

BACKGROUND OF THE INVENTION

1. Field of the Invention

This application pertains to a clean air cabinet. More particularly, this application pertains to a clean air cabinet including novel construction for improving compactness, manufacture and performance.

2. Background of the Invention

In the prior art, clean air cabinets are widely used in laboratory environments. Biological safety cabinets are a unique segment of clean air equipment used to protect product and operator from contamination with bacteria, virus, chemicals and toxic particulates. Performance and design parameters of biological safety cabinets were originated by numerous medical agencies with a very prominent role being played by the National Institutes of Health, Bethesda, Md. A combined effort of government agencies, academia, cabinet manufacturers and The National Sanitation Foundation (Ann Arbor, Mich.) established a Standard 49 for Class II Biohazard Cabinetry in 1976. Class II cabinets are identified as, Type A, Type B1, Type B2 and Type B3. The invention described herein is a Class II, Type B1 Biological Safety Cabinet. An example of a Class II, Type B1 Biological Safety Cabinet is the Labgard 420™ manufactured and sold by NuAire, Inc. of Plymouth, Minn. Such a cabinet is described in NuAire, Inc. brochure entitled LABGARD 420. On the second page of said brochure an airflow schematic is presented showing airflow through the cabinet. As indicated, room air is drawn into a grill located on the front of the cabinet work area. The air flows downward through a high efficiency particulate air (HEPA) filter located below the work surface drawn by a blower creating a vacuum in the blower compartment. The air then pressurized by the blower flows upward in a side duct on the outside of the work zone to a plenum located above the work zone; then flows downward through a second HEPA filter (or a grill) into the work zone providing clean air for the work in process. Most of the downflow air is exhausted through a dedicated duct passing to the atmosphere after passing through a HEPA filter. It is important to note that in the Class II Type B1 Cabinet the air exhausted from the work zone is not recycled and that this condition coupled with the manner in which the air is exhausted from the back of the work area provides a 100% exhaust zone for work performed in the back half of the work tray. A further characterization of the Class II, Type B1 cabinet is that the airflow through the cabinet passes through the HEPA filters that are in series in contrast to Class II, Type A cabinets in which the HEPA filters are in parallel, i.e. the supply and exhaust filters receive pressurized airflow from a common plenum.

In the manufacture of clean air cabinets, cost control is very important. Also, it is very important to manufacture cabinets in such a manner that either leaks do not occur or, if leaks do occur, they are controlled by preventing contaminated air from entering room air. Prior art cabinets typically had a construction of a box within a box. In some cases, air ducts were bolted onto the side of the cabinets. They were sealed with gaskets. However, no seal is perfect and such construction inherently would present a leak risk.

SUMMARY OF THE INVENTION

According to a preferred embodiment of the present invention, a clean air cabinet is disclosed having a unitary construction cabinet shell defining a cabinet interior. Walls disposed within the shell define a work area. The interior walls include a work area ceiling, a work area floor and a work area back wall. Each of the ceiling, back wall and floor are provided with air passages. A first plenum connects a blower outlet with the air passages formed through the work area ceiling. A high efficiency particulate air (HEPA) filter is disposed within the first plenum. A second plenum connects air passages in the floor with the blower inlet. A third plenum connects air passages in the back wall with an exhaust. A high efficiency particulate air (HEPA) filter is disposed within the third plenum.

DESCRIPTION OF THE PREFERRED EMBODIMENT

Figure 1:
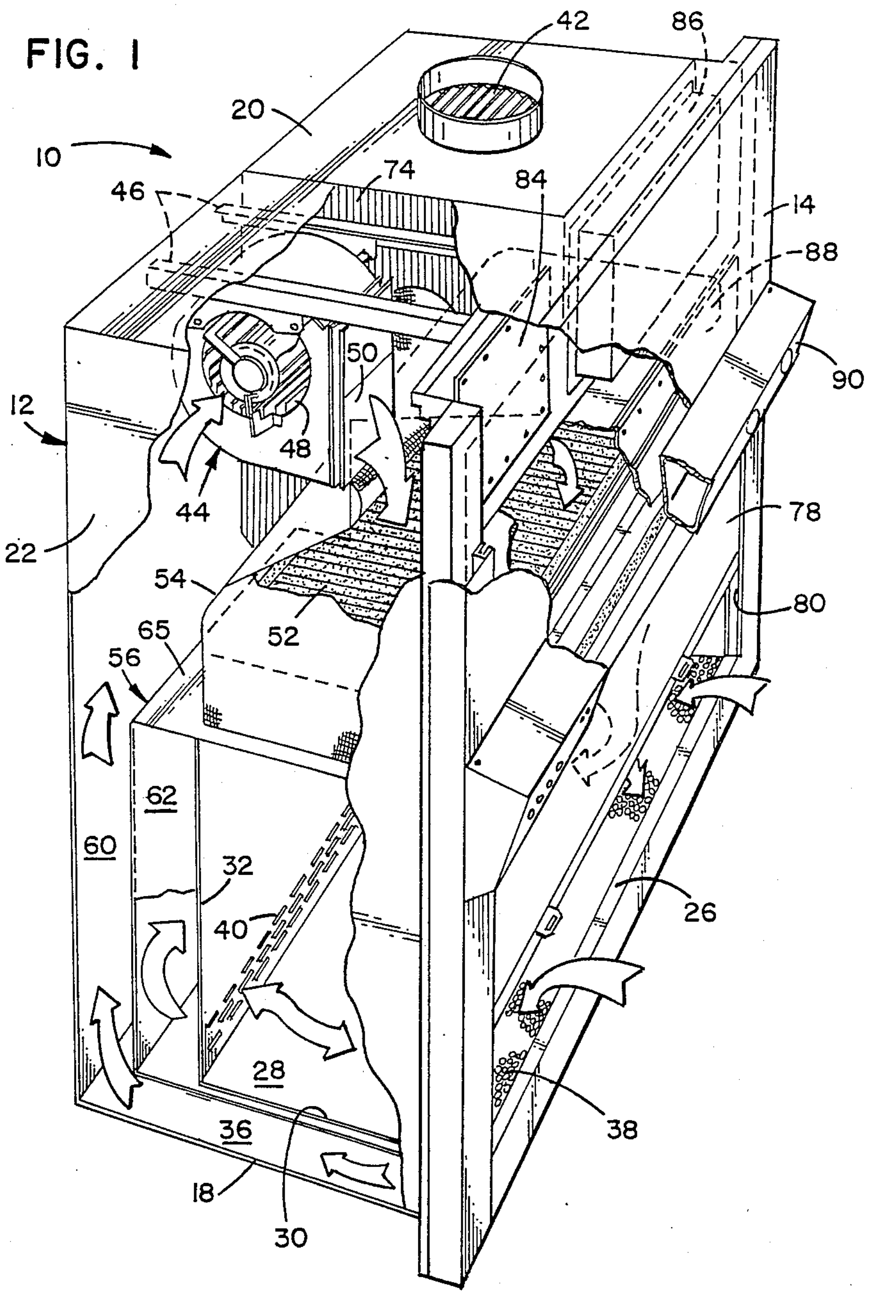
FIG. 1 is a perspective view of a clean air cabinet according to the present invention with an exterior shell partially broken away to expose interior elements.

Referring now to the several Figures, in which identical elements are numbered identically throughout, a clean air cabinet according to the present invention will now be described. The cabinet 10 includes an outer shell 12. Preferably, shell 12 is formed of stainless steel and is of one piece construction. Shell 12 includes a base 18 and a top wall 20 and a rear wall 16. Finally, shell 12 includes spaced apart side walls 22, 24. A forward face 14 is attached to shell 12.

The shell 12 and forward wall 14 define a cabinet interior. An opening 26 is formed in forward face 14. Opening 26 is sized to permit access into the cabinet interior by an operator disposed exterior of shell 12.

A plurality of internal walls define a work area 28 disposed within the cabinet interior. The plurality of walls include a work area floor 30, a work area back wall 32 and a work area ceiling 34. As shown in the Figures, the work area floor 30 is spaced from cabinet base 18 with opposing surfaces of floor 30 and base 18 defining a floor plenum 36.

Floor 30 includes a grill or perforated portion 38 adjacent opening 26. Perforated portion 38 provides an air passage between work area 28 and floor plenum 36.

The ceiling 34 is perforated, preferably in the form of a grill, so that approximately the entire ceiling 34 comprises an air passage through ceiling 34. Finally, an air passage is formed through work area back wall 32. This air passage is provided in the form of a perforated or grill portion 40 formed through the back wall and disposed adjacent work area floor 30.

The shell 12 includes an exhaust opening 42 formed through top wall 20. Also, a blower 44 is disposed mounted within the interior of cabinet shell 12 by means of mounting brackets 46 secured to the interior surface of top wall 20. The blower 44 includes a suction inlet 48 and a pressure outlet 50.

A first high efficiency particulate air (HEPA) filter 52 is provided in overlying relation to the perforated portion of work area ceiling 34. A flexible plenum 54 connects the pressure outlet 50 of blower 44 with the ceiling area 34 such that air flow from the pressure outlet 50 is forced through first HEPA filter 52 before passing through ceiling portion 34 into work area 38. It will be appreciated that a HEPA filter having a flexible plenum with a first end surrounding the HEPA filter and a second end surrounding a blower outlet forms no part of this invention per se. Such a filter is manufactured and sold under the trademark HEPEX TM by Nu Aire, Inc. of Plymouth, Minn. and is described in U.S. Pat. No. 3,828,530.

A plurality of interior walls are disposed within the volume between the shell 12 and the work area walls (such as floor 30, back wall 32 and ceiling 34). The interior walls divide the volume into a plurality of air plenums. Specifically, an intermediate dividing wall 56 is disposed between work area back wall 32 and shell rear wall 16 to cooperate with opposing wall members to define a second interior plenum 60 and a third interior plenum 62. Second plenum 60 is defined as the volume between opposing surfaces of shell 12 and intermediate dividing wall 56. Second plenum 60 is in air flow communication with floor plenum 36. Accordingly, second plenum 60 connects the perforated portion 38 of work area floor 30 with the suction inlet 48 of blower 44.

Third plenum 62 is defined between opposing surfaces of intermediate dividing wall 56 and work area back wall 32. Third plenum 62 connects the passage or perforated portion 40 of back wall 32 with shell exhaust opening 42.

Figure 3:
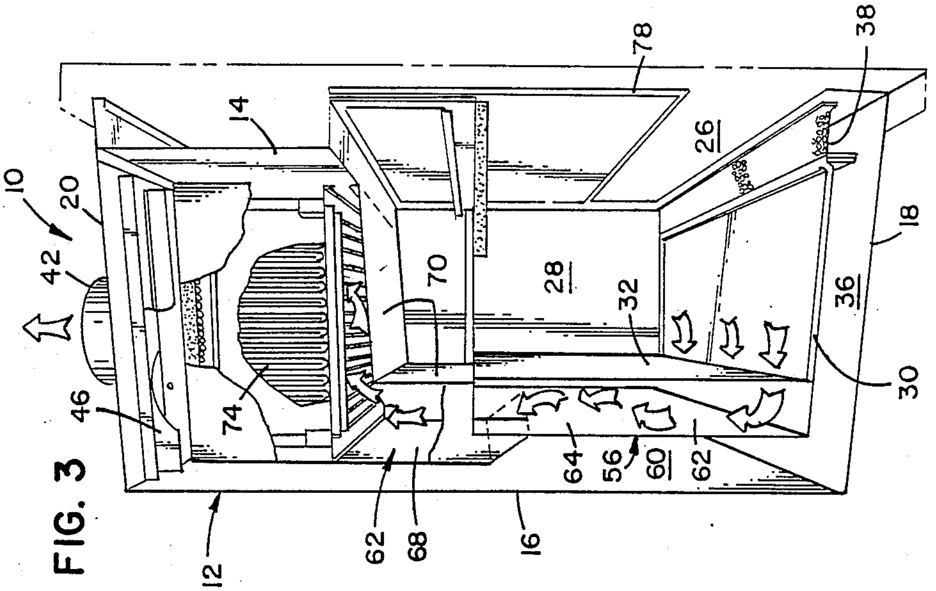
FIG. 3 is the view of FIG. 2 with the first plenum and first high efficiency particulate air (HEPA) filter and blower removed to expose a second high efficiency particulate air (HEPA) filter.
Figure 2:
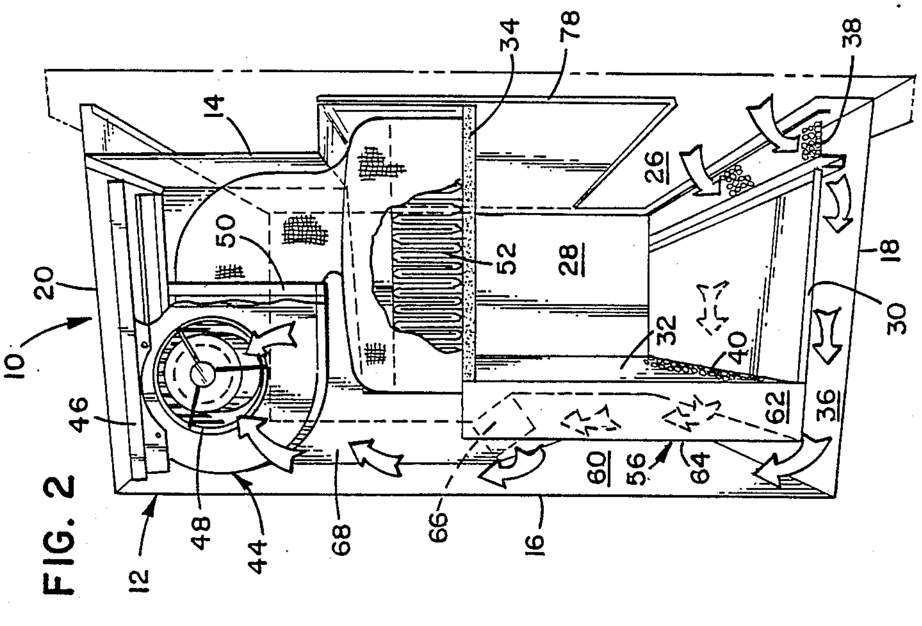
FIG. 2 is a view taken in elevation of the cabinet of the present invention showing a first plenum partially broken away to expose a first high efficiency particulate air (HEPA) filter.

As shown best in FIGS. 2 and 3, immediately behind back wall 32, third plenum 62 and second plenum 60 are disposed in back-to-back relation with third plenum 62 sandwiched between second plenum 60 and back wall 32.

Intermediate dividing wall 56 includes a plurality of wall segments including a plate 64 which extends generally parallel to and spaced from back wall 32. A left half (when viewed from the front of the cabinet) of plate 64 is folded over and integrally joined with ceiling 34 such as that portion shown at 65 in FIG. 1. A right half of plate 64 is slanted back to abut rear wall 16. The slanted portion is shown in phantom lines at 66 in FIG. 2. From the slanted portion, intermediate dividing wall 56 includes a wall 68 (shown in FIGS. 2 and 3) which abuts rear wall 16 and extends to top wall 20.

Shown best in FIG. 3, ductwork 70 surrounds second plenum 62 such that ductwork 70 and wall member 68 enclose plenum 62 such that second plenum 62 comprises roughly half of the space above HEPA filter 52 and disposed on the right hand side (when viewed from the front) of the cabinet 10. Plenum 62 is in communication with exhaust opening 42. A second HEPA filter 74 is disposed within plenum 62 and adjacent outlet 42 such that air flow through plenum 62 must pass through second HEPA filter 74 before passing through exhaust outlet 42.

A sliding glass window 78 is provided for closing cabinet opening 26. Sliding glass window 78 is received within channels 80 (shown in FIG. 1) formed in opposing edges of forward face 14 of cabinet 10.

A plurality of access openings are formed through forward face 14. These include an access opening covered by a first plate 84 permitting access to blower 44. A second access opening 86 permits access to the second HEPA filter 74. A third access opening 88 provides access to the first HEPA filter 52. A control panel 90 is mounted on the forward face 14.

The percent of air from work area 28 which is recycled may be controlled by selecting the surface area of perforated portions 38 and 40 and the capacity of blower 44 and the capacity of a fan in the building exhaust to which exhaust outlet 42 is connected. Preferably, these factors are selected such that 70% of the air flow admitted into work area 28 is exhausted and 30% is recycled through suction inlet 48.

Figure 6:
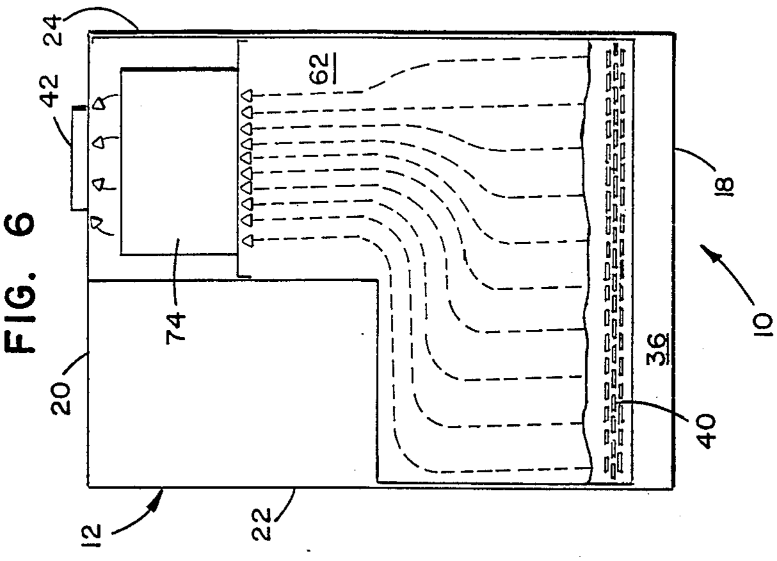
FIG. 6 is a front view taken in elevation showing air flow through a third plenum.
Figure 4:
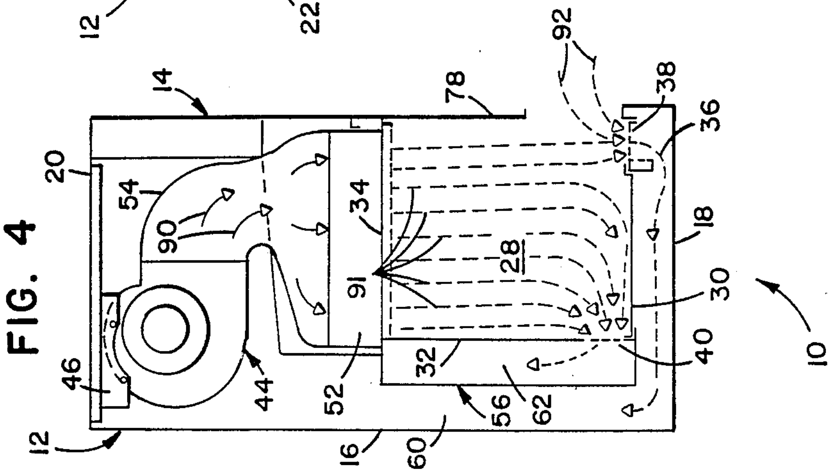
FIG. 4 is a side view taken in elevation showing, in schematic format, air flow through the clean air cabinet of the present invention.

Having described the structure of the clean air cabinet 10 of the present invention, operation of cabinet 10 can best be illustrated with reference to FIGS. 4–6 and with occasional reference to FIGS. 1–3. As shown in FIG. 4, air flow indicated by arrows 90 flows within the first plenum 54 to HEPA filter 52. As the air flows through HEPA filter 52, the air is cleaned of minute particulate matter and microorganisms.

The clean air from the first HEPA filter 52 flows in a laminar flow downwardly from work area ceiling 34 through work area 28. The laminar flow is indicated by arrows 91. The suction of blower 44 creates a vacuum in second plenum 60. This vacuum draws air through the perforated portion 38 of floor 30. Since perforated portion 38 is located adjacent opening 26, the air drawn through perforated portion 38 includes both room air (indicated by arrows 92) and a portion of the air flow from HEPA filter 52. The majority of air flow from HEPA filter 52 (i.e., in a preferred embodiment about 70%) is drawn through perforated portion 40 of back wall 32 into plenum 62.

Figure 5:
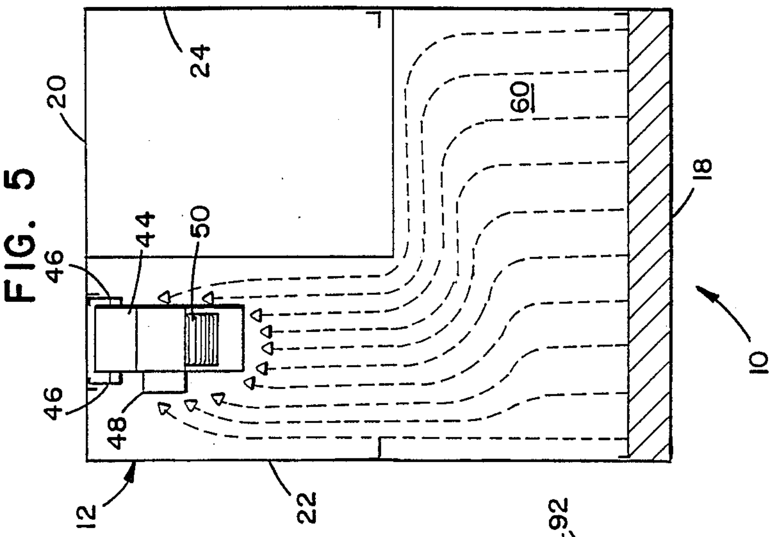
FIG. 5 is a front view taken in elevation showing air flow through a second plenum.

As shown in FIG. 5, air flow drawn along the length of work area floor 30 through perforated portion 38 is passed through plenum 60 and is directed by intermediate dividing wall 56 to the left side of the cabinet (when viewed from the front) to the suction inlet 48 of blower 44. This air flow includes approximately 30% of the air flowing from first HEPA filter 52 with remaining air flow comprised of room air, indicated by arrows 92 (shown in FIG. 4). Blower 44 pressurizes this mixture and forces it through first plenum 54 back through HEPA filter 52 so that the cycle is repeated.

The majority (i.e., about 70%) of air flow from HEPA filter 52 is drawn through perforated portion 40 and forced into plenum 62. Interior dividing wall 56 directs this air flow to the right of the cabinet (when viewed from the front as in the view in FIG. 6) such that this air flow is forced through second HEPA filter 74. Second HEPA filter 74 cleans this contaminated air of its particulate matter and microorganisms before passing this air through exhaust opening 42. In a preferred embodiment, exhaust opening 42 will be connected to a building exhaust system which will include a fan for assisting air flow through exhaust opening 42.

With the construction and operation of the clean air cabinet of the present invention now described, the benefits of the present invention over the prior art can be readily identified. The interior dividing wall 56 defines the third plenum 62 and the third plenum 62. At the points of attachment of the wall 56, the wall 56 is surrounded by a vacuum plenum 60. As a result, any leakage which may occur at the point of attachment of intermediate dividing wall 56 are surrounded by a vacuum. Therefore, any leakage of contaminated air from plenum 62 is drawn by the vacuum in plenum 60 to the suction inlet of blower 44. Therefore, contaminated air cannot escape to the environment.

The unitary construction of shell 12 prevents leakage. However, even if leakage were to occur, the flow of air would be from the exterior into the suction air in plenum 60. Again, contaminated air cannot escape to the environment.

The elimination of air flow ducts external to cabinet shell 12 (as found in the prior art) abates contaminated air leakage to the room which can cause illness to humans and laboratory test animals. In the present invention, all air flow ducts are internal and are either operated at a vacuum relative to the room or are surrounded by a vacuum, if under pressure.

Due to Laminar flow in the work area 28 and the location of grill 38 near opening 26, about 100% of contaminated air near the junction of back wall 32 and floor 30 is exhausted. Therefore, particularly obnoxious chemicals can be placed in this area without fumes being recycled to the work area 28.

In the present invention, the HEPA filter for air which will be supplied to the work zone is located at the top of the work zone above the work area ceiling. In the prior art, for example as shown in the Labgard TM NU 410, the supply filter is located beneath the work area. In that prior art cabinet, the filtered air is then ducted to the top of the work area. In the present invention, the HEPA filter is immediately available for access and testing.

From the foregoing detailed description of the present invention, it has been shown how the invention has been obtained in a preferred manner. However, modifications and equivalents of the disclosed concepts such as readily occur to those skilled in the art, are intended to be included in the scope of this invention. Thus, the scope of the invention is intended to be limited only by the scope of the claims as are, or may hereafter be appended hereto.

What is claimed is:

1. A clean air cabinet comprising:

a cabinet shell defining a cabinet interior with means for defining a cabinet opening sized to permit access into said interior by an operator disposed exterior of said shell;

an exhaust opening formed through said shell;

a blower having a suction inlet and a pressure outlet;

internal wall means disposed within said shell and defining a work area within said interior and in communication with said cabinet opening, said interior wall means including means for defining a work area floor, a work area back wall and a work area ceiling;

said ceiling including first air passage means for passing air flow between said cabinet interior and said work area;

first plenum means for connecting said pressure outlet with said ceiling for directing air flow from said outlet through said first air passage means;

first high efficiency particulate air filter means disposed within said first plenum means for filtering air passing from said outlet to said ceiling;

second air passage means disposed within said work area floor in close proximity to said cabinet opening;

second plenum means contained with said shell and connecting said second air passage means with said inlet;

third air passage means disposed for air passage through said work area back wall;

third plenum means contained within said shell for connecting said third air passage means with said exhaust opening, said second plenum means and said third plenum means disposed in at least partial back-to-back relation between opposing surfaces of said work area back wall and said shell;

second high efficiency particulate air filter means disposed within said third plenum means for filtering air flowing to said exhaust opening.

2. A clean air cabinet according to claim 1 wherein said shell is of unitary construction.

3. A clean air cabinet according to claim 1 wherein said third plenum means is disposed between said second plenum means and said work area back wall.

4. A clean air cabinet according to claim 1 including means formed through said shell for access to said high efficiency particulate air filters.

5. A clean air cabinet according to claim 1 including means formed through said shell for access to said blower.

6. A clean air cabinet according to claim 1 including means for removeably closing said cabinet opening.

7. A clean air cabinet according to claim 1 wherein said first, second and third air passage means are selected for 70% of air flow through said cabinet to be exhausted through said exhaust opening and 30% of said air flow to be passed through said blower outlet into said work area.

8. A clean air cabinet comprising:

a cabinet shell including a rear wall, a base and a top wall, all cooperating to define a cabinet interior, means for defining a cabinet opening sized to permit access into said interior by an operator disposed exterior of said shell;

interior wall means disposed within said shell and defining a work area in communication with said cabinet opening, said interior wall means including a work area floor disposed at a lower edge of said cabinet opening and spaced from said cabinet base, a work area ceiling disposed at an upper edge of said cabinet opening and spaced from said cabinet top, a work area back wall joining said work area ceiling and said work area floor and spaced from said cabinet rear wall, said work area ceiling including first air passage means for passing air flow through said ceiling, said work area floor including second air passage means for passing air flow through a portion of said floor in close proximity to said cabinet opening, said back wall including third air passage means for passing air flow through a portion of said back wall in close proximity to said work area floor;

an exhaust opening formed through said shell;

a blower disposed within said cabinet interior and having an inlet and an outlet;

first plenum means connecting said blower outlet with said first passage means, exterior surfaces of said first plenum means spaced from interior surfaces of said shell;

first high efficiency particulate air filter means disposed within said first plenum means for filtering air passing through said first plenum means;

dividing wall means disposed between said back wall and said rear wall, opposing surfaces of said dividing wall means and said rear wall defining a second plenum means and connecting said second air passage means with said blower inlet, opposing surfaces of said dividing wall means and said back wall defining a third air plenum means connecting said third air passage means with said exhaust opening;

second high efficiency particulate air filter means disposed within said third plenum means for filtering air flow passing from said third air passage means to said exhaust opening.

9. A clean air cabinet according to claim 8 wherein said shell is of unitary construction.

10. A clean air cabinet according to claim 8 including means formed through said shell for access to said filters.

11. A clean air cabinet according to claim 8 including means formed through said shell for access to said blower.

12. A clean air cabinet according to claim 8 including means for selectively closing said cabinet opening.

13. A clean air cabinet according to claim 8 wherein said first, second and third air passage means and said blower is selected for 70% of air flow through said cabinet to be exhausted through said exhaust opening and 30% of said air flow through said cabinet to be recycled through said first high energy particulate air filter into said work area.

* * * * *